(12) United States Patent
Kim et al.

(10) Patent No.: US 7,871,545 B2
(45) Date of Patent: Jan. 18, 2011

(54) HYBRID COMPOSITE INCLUDING CARBON NANOTUBE AND CARBIDE-DERIVED CARBON, ELECTRON EMITTER INCLUDING THE HYBRID COMPOSITE, METHOD OF PREPARING THE ELECTRON EMITTER, AND ELECTRON EMISSION DEVICE INCLUDING THE ELECTRON EMITTER

(75) Inventors: Yoon-Jin Kim, Suwon-si (KR); Jae-Myung Kim, Suwon-si (KR); Hee-Sung Moon, Suwon-si (KR); Dong-Sik Zang, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 12/118,618

(22) Filed: May 9, 2008

(65) Prior Publication Data
US 2009/0026424 A1    Jan. 29, 2009

(30) Foreign Application Priority Data
May 10, 2007    (KR) .................. 10-2007-0045413

(51) Int. Cl.
$H01B \ 1/04$ (2006.01)
$B32B \ 9/00$ (2006.01)
$B05D \ 3/02$ (2006.01)

(52) U.S. Cl. .................. 252/516; 977/742; 428/698; 428/696; 427/372.2

(58) Field of Classification Search .......... 252/516; 977/742; 428/696, 698; 427/372.2
See application file for complete search history.

(56) References Cited

FOREIGN PATENT DOCUMENTS

| JP | 2001-048507 | * | 2/2001 |
|---|---|---|---|
| KR | 10-2005-0024674 | | 3/2005 |
| WO | WO 98/54111 | | 12/1998 |

OTHER PUBLICATIONS

Zuleta, et al., "Determination of diffusion coefficients of $BF_4^-$ inside carbon nanopores using the single particle microelectrode technique," Journal of Electroanalytical Chemistry, vol. 586 (2006) pp. 247-259.

* cited by examiner

*Primary Examiner*—Ling-Siu Choi
*Assistant Examiner*—Monique Peets
(74) *Attorney, Agent, or Firm*—Christie, Parker & Hale, LLP

(57) ABSTRACT

Hybrid composites including carbon nanotubes and a carbide-derived carbon material, electron emitters including the hybrid composites, methods of preparing the electron emitters, and electron emission devices including the electron emitters are provided. Specifically, a hybrid composite includes at least one carbon nanotube and a carbide-derived carbon material. The carbide-derived carbon material is prepared by thermochemically reacting a carbide compound with a halogen-containing gas to extract substantially all of the elements except for the carbon in the carbide compound. Since the carbon nanotubes and the carbide-derived carbon material are hybridized and composited, a screen effect that may occur when large amounts of carbon nanotubes are used can be prevented, and an electron emitter including the hybrid composite has excellent electron emission capabilities, excellent uniformity, and a long lifetime.

7 Claims, 8 Drawing Sheets

HYBRID COMPOSITE INCLUDING CARBON NANOTUBE AND CARBIDE-DERIVED CARBON, ELECTRON EMITTER INCLUDING THE HYBRID COMPOSITE, METHOD OF PREPARING THE ELECTRON EMITTER, AND ELECTRON EMISSION DEVICE INCLUDING THE ELECTRON EMITTER

CROSS-REFERENCE TO RELATED PATENT APPLICATIONS

This application claims priority to and the benefit of Korean Patent Application No. 10-2007-0045413, filed on May 10, 2007 in the Korean Intellectual Property Office, the entire content of which is incorporated herein by reference.

BACKGROUND OF THE INVENTION

1. Field of the Invention

The present invention relates to hybrid composites including carbon nanotubes and carbide-derived carbon, electron emitters including the hybrid composites, methods of preparing the electron emitters, and electron emission devices including the electron emitters.

2. Description of the Related Art

In general, electron emission devices include electron emitters categorized into hot cathode type electron emitters and cold cathode type electron emitters. Examples of electron emission devices including cold cathode type electron emitters include field emitter array (FEA)-type electron emission devices, surface conduction emitter (SCE)-type electron emission devices, metal insulator metal (MIM)-type electron emission devices, metal insulator semiconductor (MIS)-type electron emission devices, ballistic electron surface emitting (BSE)-type electron emission devices, and the like.

In the electron emission devices described above, the electron emitters that emit electrons may be formed of carbonaceous materials, such as carbon nanotubes, that have excellent conductivity, excellent field enhancement effects, excellent field emission properties, and low work functions.

However, even when carbon nanotubes are vertically oriented in electron emission devices, electron emission may not occur, or electron emission performance may be decreased due to screen effects caused by adjacent carbon nanotubes. Such results may be due to incomplete ohmic contact between the carbon nanotubes and the electrode. In general, carbon nanotubes are shaped into fibers, and such fiber-shaped carbon nanotubes have large field enhancement factors (i). The fiber-shaped materials, however, lack uniformity and lifetime.

SUMMARY OF THE INVENTION

According to one embodiment of the present invention, a hybrid composite is used to prepare an electron emitter. The hybrid composite prevents screen effects that can occur with the use of large amounts of carbon nanotubes, and has excellent brightness uniformity and a long lifetime. In another embodiment of the present invention, an electron emitter includes the hybrid composite. According to another embodiment, a method of preparing the electron emitter is provided. In yet another embodiment, an electron emission device includes the electron emitter.

According to one embodiment of the present invention, a hybrid composite includes at least one carbon nanotube, and a carbide-derived carbon material prepared by thermochemically reacting a carbide compound with a halogen-containing gas to extract substantially all of the elements except for the carbon in the carbide compound.

According to another embodiment of the present invention, a method of preparing an electron emitter includes preparing a hybrid composite composition by stirring at least one carbon nanotube, a carbide-derived carbon material and a vehicle comprising a binder to prepare a hybrid composite composition. The carbide-derived carbon material is prepared by thermochemically reacting a carbide compound with a halogen-containing gas to extract substantially all of the elements except for the carbon in the carbide compound. The method further includes placing the hybrid composite composition on a substrate and sintering the resulting product.

According to another embodiment of the present invention, an electron emitter is prepared using the method.

According to another embodiment of the present invention, an electron emission device includes the electron emitter.

BRIEF DESCRIPTION OF THE DRAWINGS

The above and other features and advantages of the present invention will become more apparent by reference to the following detailed description when considered in conjunction with the attached drawings in which.

DETAILED DESCRIPTION OF THE INVENTION

A hybrid composite according to one embodiment of the present invention includes at least one carbon nanotube, and a carbide-derived carbon material prepared by thermochemically reacting a carbide compound with a halogen-containing gas to extract substantially all of the elements except for the carbon in the carbide compound.

In a typical electron emission device, carbon nanotubes of an electron emitter are vertically grown to improve electron emission capabilities. However, even when carbon nanotubes are vertically oriented, electron emission may not occur. In addition, when a large amount of carbon nanotubes are used, a screen effect may occur due to adjacent carbon nanotubes and thus, electron emission performance may decrease. Such phenomena may occur due to incomplete ohmic contact between the carbon nanotubes and the electrode. The inventors of the present application have found that the screen effect between carbon nanotubes could be prevented by hybridizing and compositing at least one carbon nanotube and a carbide-derived carbon material to make a conductive material. The inventors also found that processibility, such as dispersibility, during manufacture of an electron emitter could be improved using a hybrid composite including a carbide-derived carbon material, and that the resulting electron emission device has a longer lifetime.

Figure 2A:
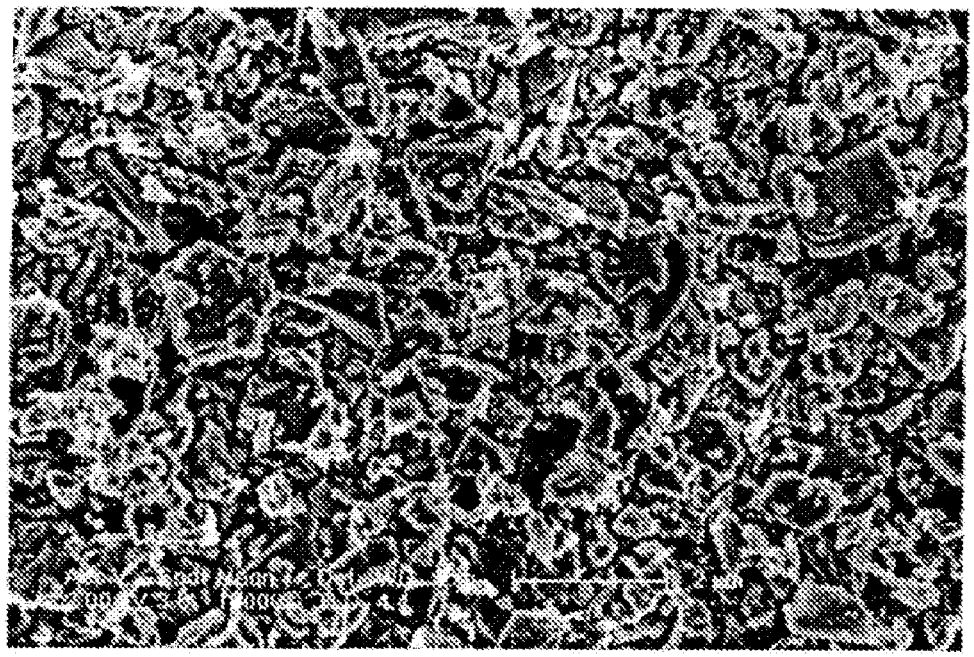
FIG. 2A is a scanning electron microscope (SEM) image of a carbide-derived carbon material of a hybrid composite according to an embodiment of the present invention.
Figure 2B:
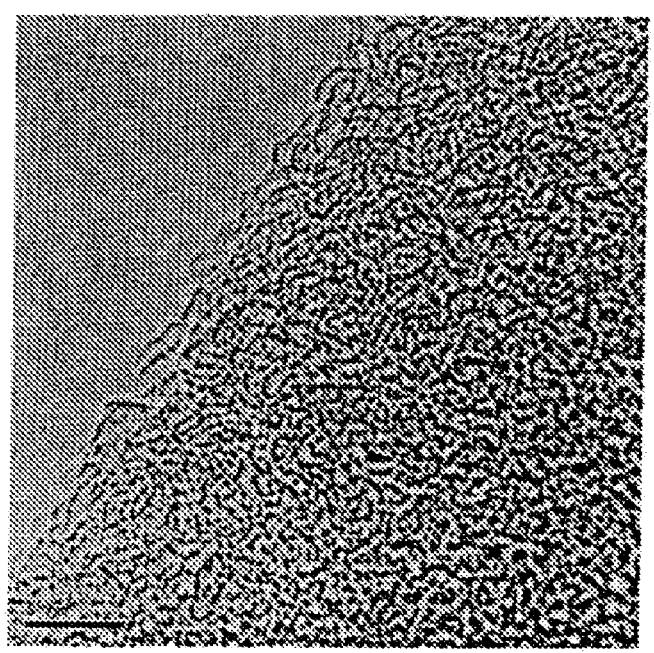
FIG. 2B is a transmission electron microscopic (TEM) image of a carbide-derived carbon material of a hybrid composite according to an embodiment of the present invention.

FIG. 2A is a scanning electron microscope (SEM) image, and FIG. 2B is a transmission electron microscope (TEM) image of a carbide-derived carbon material of a hybrid composite according to an embodiment of the present invention. The carbide-derived carbon material can be prepared by thermochemically reacting a carbide compound with a halogen-containing gas to extract substantially all of the elements except for the carbon in the carbide compound. For example, a carbide-derived carbon material can be prepared by forming a workpiece with a specified transport porosity in particles of a carbide compound, and forming nanopores in the workpiece by performing a thermochemical treatment at a temperature ranging from about 350° C. to about 1200° C. in a gaseous halogen medium to extract substantially all of the elements except for the carbon in the workpiece.

Specifically, the carbide compound used to prepare the carbide-derived carbon material of the hybrid composite according to one embodiment may be a compound including carbon and at least one atom of Group II, Group III, Group IV, Group V, or Group VI of the periodic table. Nonlimiting examples of suitable carbide compounds include diamond-based carbides (such as silicon carbide (Si—C) or boron carbide (B—C)), carbides (such as titanium carbide (Ti—C) or zirconium carbide (Zr—C)), salt-based carbides (such as aluminum carbide (Al—C) or calcium carbide (Ca—C)), complex carbides (such as titanium-tantalum carbide (Ti—Ta—C) or molybdenum-tungsten carbide (Mo—W—C)), carbonitrides (such as titanium carbonitride (Ti—C—N) or zirconium carbonitride (Zr—C—N)), and combinations thereof. Among these compounds, when silicon carbide, boron carbide, aluminum carbide, or a mixture thereof is used, the carbide-derived carbon material can be produced in high yield, and an electron emission device manufactured using the carbide-derived carbon material has excellent emission performance and a long lifetime.

When the carbide-derived carbon material of the hybrid composite is prepared using a silicon carbide represented by $Si_xC_y$, a mole ratio of y to x may range from about 0.95 to about 1.05, which ratio is desired based on stoichiometry and structural stability. When the carbide-derived carbon material of the hybrid composite is prepared using a boron carbide represented by $B_{x'}C_{y'}$, a mole ratio of y' to x' may be in the range from 0.24 to 0.26, which is desired in terms of stoichiometry and structural stability. When the carbide-derived carbon material of the hybrid composite is prepared using an aluminum carbide represented by $Al_{x''}C_{y''}$, a mole ratio of y'' to x'' may range from about 0.74 to about 0.76, which ratio is desired based on stoichiometry and structural stability.

The halogen-containing gas may be $Cl_2$ gas, $TiCl_4$ gas, or $F_2$ gas.

Specifically, one exemplary carbide-derived carbon material is one that when subjected to Raman spectrum analysis conditions including Ar 514.5 nm, 2 mW, 60 sec (twice), and 50×, exhibits an intensity ratio of a disordered-induced D band at 1350 cm$^{-1}$ to a graphite G band at 1590 cm$^{-1}$ ranging from about 0.2 to about 5. Another exemplary carbide-derived carbon material has a specific surface area ranging from about 500 m$^2$/g to about 1400 m$^2$/g, and in one embodiment has a specific surface area ranging from about 700 to about 1000 m$^2$/g. Yet another exemplary carbide-derived carbon material is one that when subjected to X-ray diffraction analysis, exhibits a weak peak or wide single peak of a graphite (002) surface at 2θ=25. Still another exemplary carbide-derived carbon material is one that when subjected to transmission electron microscope analysis, exhibits a halo-pattern of an amorphous carbon. These carbide-derived carbon materials may have excellent electron emission properties.

In general, Raman spectrum analysis results, X-ray diffraction analysis results, and electron microscope analysis results are used to measure a degree of crystallization. Accordingly, the carbide-derived carbon materials according to embodiments of the present invention having the results described above may have structural characteristics similar to amorphous carbon having a degree of crystallization in a short range order. It has been reported that amorphous carbon having a degree of crystallinity in a short range order has a mixed structure of a bent graphite sheet and open pores having a non-6-membered ring structure. It is assumed that the carbide-derived carbon material emits fields from open pores having a non-6-membered ring structure which is perpendicular to a surface of the carbide-derived carbon material.

Figure 3:
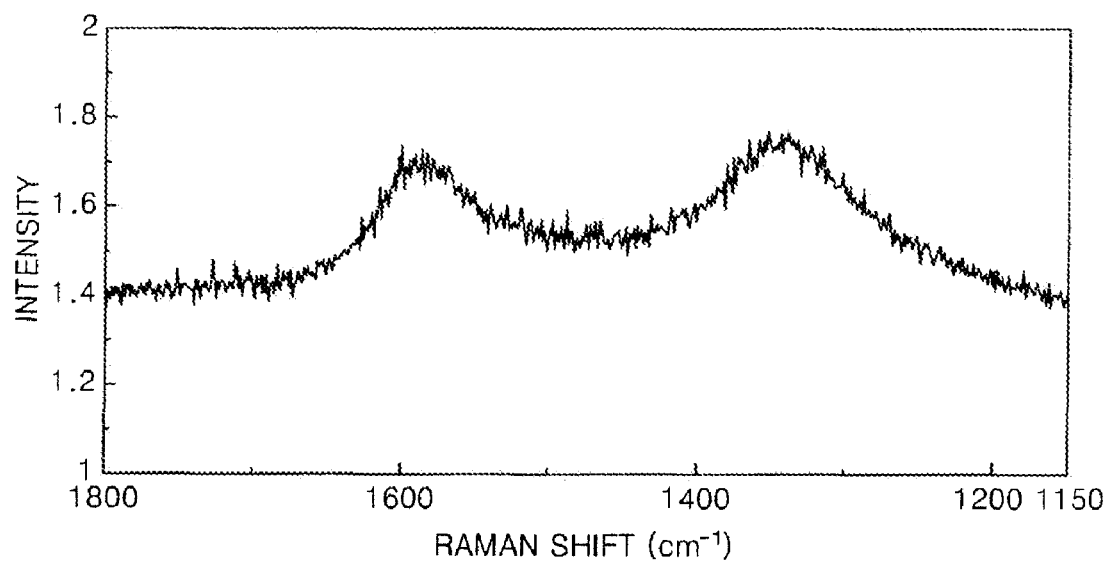
FIG. 3 is a graph of Raman spectrum analysis results of a carbide-derived carbon of a hybrid composite according to an embodiment of the present invention.

FIG. 3 shows the results of Raman spectrum analysis of a carbide-derived carbon material of a hybrid composite according to an embodiment of the present invention. The analysis was performed under the following conditions: Ar 514.5 nm, 2 mW, 60 sec (twice), 50×. Referring to FIG. 3, the intensity of a disordered-induced D band at 1350 cm$^{-1}$ is about 1.75, and the intensity of a graphite G band at 1590 cm$^{-1}$ is about 1.70. As a result, the ratio of the intensity of a graphite G band at 1590 cm$^1$ to the intensity of a disordered-induced D band at 1350 cm$^{-1}$ ($I_G/I_D$) is about 0.97.

Figure 4:
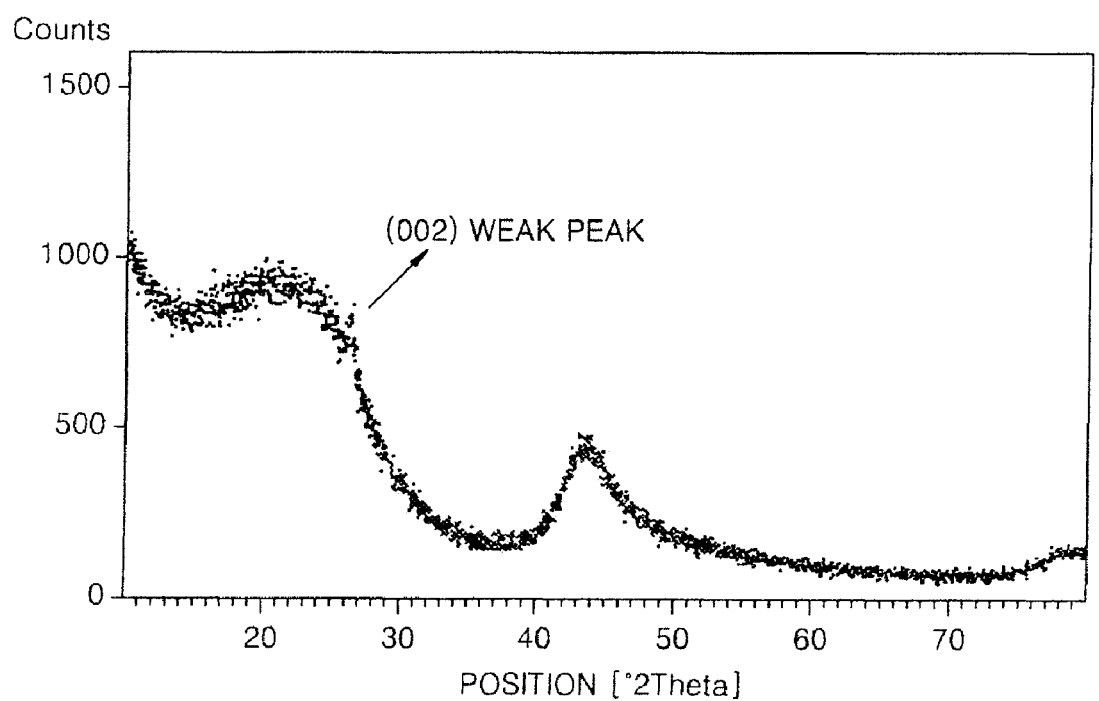
FIGS. 4 and 5 are graphs of X-ray diffraction spectra of a carbide-derived carbon of a hybrid composite according to an embodiment of the present invention.
Figure 5:
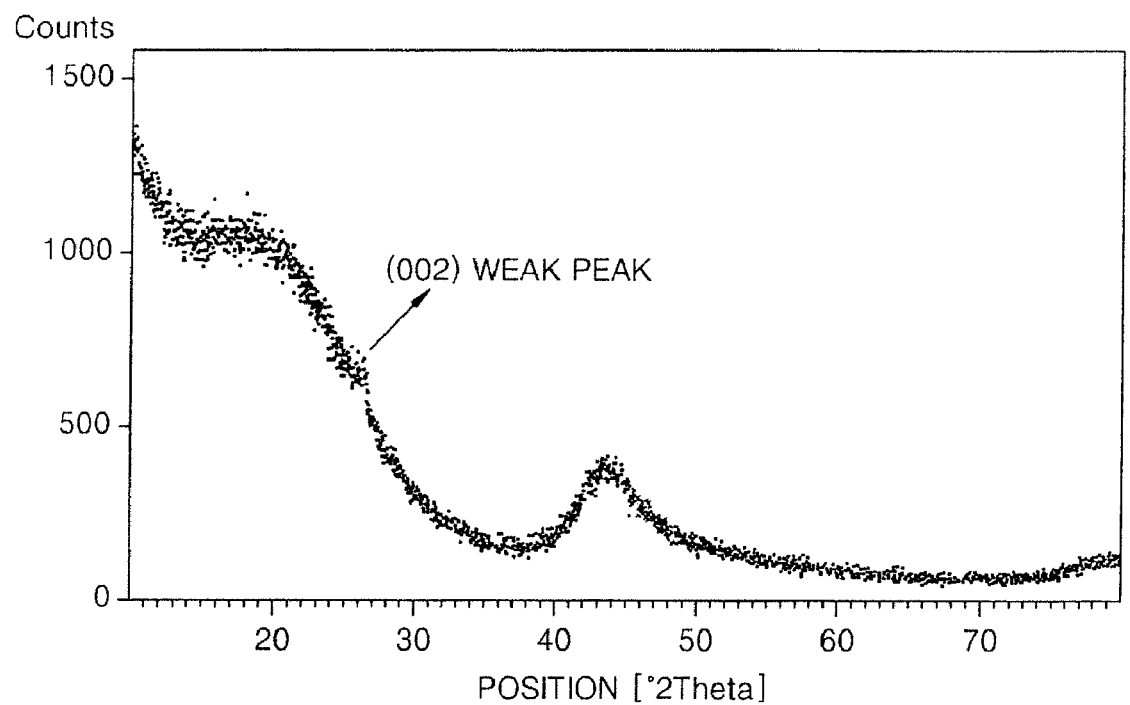
Figure 6:
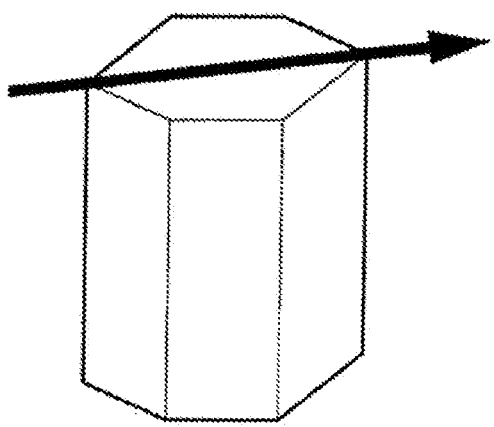
FIG. 6 is a perspective view of a crystalline structure of graphite.
Figure 7:
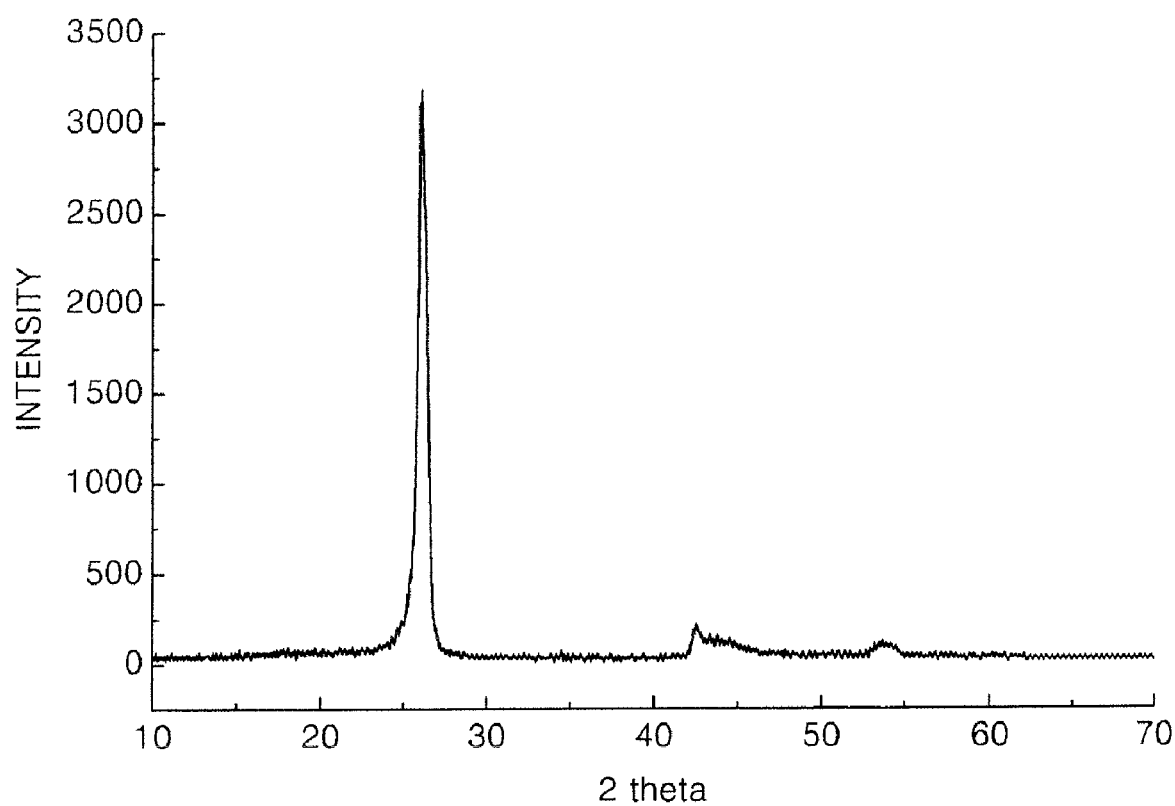
FIG. 7 is a graph of an X-ray diffraction spectrum of a crystalline graphite.

FIGS. 4 and 5 are X-ray diffraction spectra of a carbide-derived carbon material of a hybrid composite according to an embodiment of the present invention. Referring to FIGS. 4 and 5, a weak peak of a graphite (002) surface is present at 2θ=25° in the X-ray diffraction spectra of the carbide-derived carbon material. If the crystalline structure of graphite is supposed to be hexagonal, the peak of the graphite (002) surface, as illustrated in FIG. 6, may be formed by diffraction of an X ray irradiating in parallel with respect to an upper surface of the hexagonal structure of the graphite. As illustrated in FIG. 7, a typical crystalline graphite shows a very strong peak at 2θ=25°. However, the carbide-derived carbon material of a hybrid composite according to an embodiment of the present invention shows a very weak peak at 2θ=25°. Accordingly, the carbide-derived carbon material of the hybrid composite has an amorphous property different from crystalline graphite.

Figure 8:
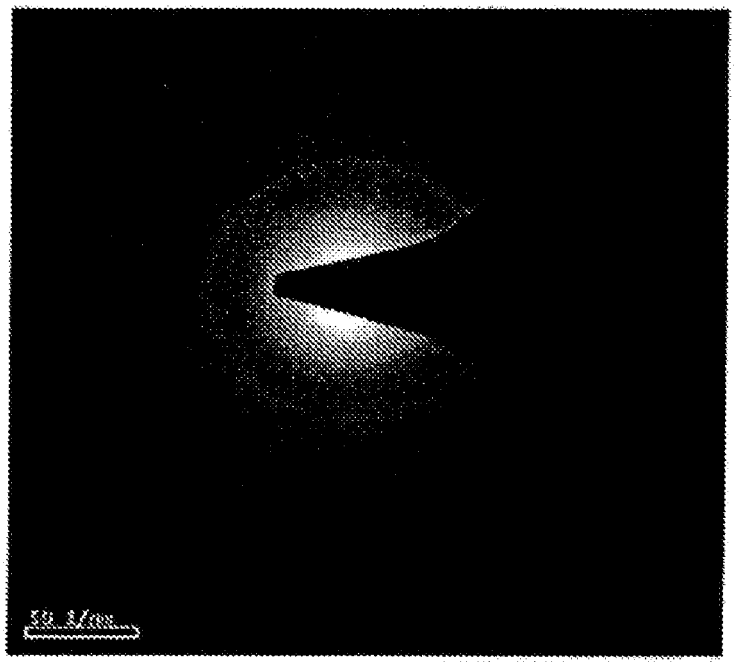
FIG. 8 is a TEM image of a carbide-derived carbon of a hybrid composite containing a halo pattern according to an embodiment of the present invention.

FIG. 8 is a TEM image of a carbide-derived carbon material of a hybrid composite according to an embodiment of the present invention, including a carbide induced halo-pattern. An electron diffraction pattern of crystalline carbon has a shape in which a plurality of spots are dispersed. However, the electron diffraction pattern of the carbide-derived carbon material has the shape of a gentle circle. That is, the electron diffraction pattern of the carbide-derived carbon material is a halo-pattern of an amorphous carbon. Accordingly, the carbide-derived carbon material has an amorphous property different from crystalline carbon.

The at least one carbon nanotube in the hybrid composite according to one embodiment of the present invention can be any commercially available electron emitter material. Nonlimiting examples of carbon nanotubes include allotropes of carbon that have tube-like shapes formed of sheets of graphite rolled up with a diameter of a nanometer, such as single walled nanotubes and multi walled nanotubes. The at least one carbon nanotube used in an embodiment of the present invention can be prepared by chemical vapor deposition (CVD), such as thermal CVD, DC plasma CVD, RF plasma CVD, or microwave plasma CVD.

In the hybrid composite according to an embodiment of the present invention, the carbide-derived carbon material is hybridized with at least one carbon nanotube. The weight ratio of the carbon nanotube to the hybridized carbide-derived carbon material may range from about 0.0001 to about 5, for example from about 0.001 to about 2. When the weight ratio of the carbon nanotube to the hybridized carbide-derived carbon material is less than about 0.001, a conductive network may be insufficiently formed, and when the triode operates, the operating voltage may increase. On the other hand, when the weight ratio of the carbon nanotube to the hybridized carbide-derived carbon material is greater than about 2, viscosity may be too high causing deterioration in processibility inhibiting or preventing uniform emission. In addition, the amount of the carbon nanotube used can be reduced since the carbide-derived carbon material is hybridized together with the carbon nanotube. Thus, dispersibility can be improved in the process of preparing an electron emitter.

A method of preparing an electron emitter including the hybrid composite according to an embodiment of the present invention will now be described in detail. First, a hybrid composite is prepared by mixing at least one carbon nanotube, a carbide-derived carbon material and a vehicle. The carbide-derived carbon material is prepared by thermochemically reacting a carbide compound with a halogen-containing gas to extract substantially all of the elements except for the carbon of the carbide compound.

The carbide-derived carbon material and carbon nanotube used in the method of preparing an electron emitter can be the carbide-derived carbon material and carbon nanotube described above.

The vehicle used in the method of preparing an electron emitter may control printability and viscosity, and may include a binder, a crosslinking agent, a photoinitiator, and a solvent.

The binder may be a copolymer of a carboxylic group-containing monomer and at least one ethylene-containing unsaturated monomer, and allows the hybrid composite to be developed with a proper viscosity. In the vehicle, the amount of the binder may range from about 5 to about 40 wt %. When the amount of the binder is outside this range, developability may decrease or the degree of shrinkage during sintering may increase.

Nonlimiting examples of suitable carboxylic group-containing monomers include acrylic acids, methacrylic acids, fumaric acids, maleic acids, vinyl acetic acid, anhydrides thereof, and combinations thereof. Nonlimiting examples of suitable ethylene-containing unsaturated monomers include methylacrylate, methylmethacrylate, ethylacrylate, ethylmethacrylate, n-butylacrylate, n-butylmethacrylate, isobutylacrylate, isobutylmethacrylate, 2-hydroxyethylacrylate, 2-hydroxyethylmethacrylate, ethyleneglycolmonomethyletheracrylate, ethyleneglycolmonomethylethermethacrylate, and combinations thereof. Alternatively, the binder can be a polymer that contains a crosslinking group prepared by reacting the carboxyl group of the copolymer with the ethylene-containing unsaturated compound of the copolymer. Nonlimiting examples of suitable ethylene-containing unsaturated compounds include glycidylmethacrylate, 3,4-epoxycyclohexylmethylmethacrylate, and 3,4-epoxycyclohexylmethylacrylate.

Although the binder can be prepared using the copolymer alone, to improve developability, the copolymer may further include a material selected from cellulose, hydroxymethylcellulose, hydroxyethylcellulose, carboxymethylcellulose, carboxyethylcellulose, carboxyethylmethylcellulose, and combinations thereof. The crosslinking agent in the vehicle can be a single-functional monomer or a multi-functional monomer. In one embodiment, the crosslinking agent is a multi-functional monomer due to excellent exposure sensitivity of multi-functional monomers. Nonlimiting examples of the multi-functional monomer include diacrylates (such as ethylene glycol diacrylate(EGDA)), triacrylates (such as trimethylolpropane triacrylate(TMPTA), trimethylolpropanethoxylatetriacrylate(TMPEOTA), and pentaerythritoltriacrylate(PETA)), tetraacrylates (such as tetramethylolpropane tetraacrylate, and pentaerythritoltetraacrylate), and hexaacrylates (such as dipentaerythritol hexaacrylate(DPHA)). In the vehicle, the amount of the crosslinking agent may range from about 5 to about 30 wt %. When the amount of the crosslinking agent is less than about 5 wt %, exposure sensitivity of the composition including the hybrid composite may decrease. On the other hand, when the amount of the crosslinking agent is greater than about 30 wt %, the viscosity of the composition including the hybrid composite may decrease, thus deteriorating printability.

Nonlimiting examples of suitable photoinitiators for inclusion in the vehicle include benzophenone, methyl o-benzoylbenzoate, 4,4-bis(dimethylamino)benzophenone, 4,4-bis(diethylamino)benzophenone, 2,2-diethoxyacetophenone, 2,2-dimethoxy-2-phenylacetophenone, 2-methyl-[4-(methylthio)phenyl]-2-morpholinopropan-1-one, 2-benzyl-2-dimethylamino-1-(4-morpholinophenyl)-1-butanone, bis (2,6-dimethoxybenzoyl)-2,4,4-trimethylpentylphosphineoxide, and bis(2,4,6-trimethylbenzoyl)phenylphosphineoxide. In the vehicle, the amount of the photoinitiator may range from about 1 to about 10 wt %. When the amount of the photoinitiator is less than about 1 wt %, the exposure sensitivity of the composition including the hybrid composite may decrease. On the other hand, when the amount of the photoinitiator is greater than about 10 wt %, developability may deteriorate.

The solvent can be any solvent that dissolves the binder and the photoinitiator, that is easily mixed with the crosslinking agent and other additives, and that has a boiling point of about 150° C. or greater. When the boiling point of the solvent is lower than about 150° C., the solvent may evaporate too quickly during preparation of the composition including the hybrid composite (specifically in a 3-roll mill process), and printability may deteriorate since the solvent may evaporate too quickly during printing. Nonlimiting examples of suitable solvents complying with these requirements include ethylcarbitol, butylcarbitol, ethylcarbitolacetate, butylcarbitolacetate, texanol, terpene oil, dipropyleneglycolmethylether, dipropyleneglycolethylether, dipropyleneglycolmonomethyletheracetate, γ-butyrolactone, cellosolveacetate, butylcellosolveacetate, and tripropyleneglycol. In the vehicle, the amount of the solvent may range from about 30 to about 80 wt %. When the amount of the solvent is less than about 30 wt %, the viscosity of the composition is too high, thus deteriorating printability of the composition. On the other hand, when the amount of the solvent is greater than about 80 wt %, the viscosity of the composition is too low, thus deteriorating printability of the composition.

The vehicle may further include a plasticizer to control drying speed and provide flexibility to the composition. The amount of the plasticizer may range from about 0 to about 10 wt % based on 100 wt % of the vehicle. The plasticizer can be dioctylphthalate, diisooctylphthalate, butylbenzylphthalate, dibutylphthalate, dicaprylphthalate, or a combination thereof in a specified mixture ratio.

Furthermore, the vehicle may further include a sensitizer for improving sensitivity, a polymerization inhibitor and antioxidant for improving maintenance of the composition, an ultraviolet absorber for improving resolution, an anti-foaming agent for reducing foam in the composition, a dispersant for improving dispersibility, a leveling agent for improving planarization properties during printing, and the like.

A hybrid composite composition may be prepared by mixing the carbide-derived carbon material, at least one carbon nanotube, and a vehicle, and stirring the resultant mixture by mechanical stirring, ultrasound treatment, 3-roll milling, ball milling, or sand milling until a homogenous composition is obtained. Stirring can be performed 8 times. Alternatively, the composition including the hybrid composite can be prepared by mixing a carbide-derived carbon material, at least one carbon nanotube, and an organic solvent, and adding other additives, such as a binder and a photoinitiator, to the mixture, and then stirring the resultant mixture.

Then, the hybrid composite composition is printed on a substrate. An electron emitter according to the present invention can be prepared using a conventional inkjet method. The term "substrate" as used herein refers to a substrate on which an electron emitter is to be formed, and can be different according to the electron emission device to be produced, which is appreciated by those of ordinary skill in the art. For example, when the electron emission device to be produced includes a cathode, an anode, and a gate electrode disposed between the cathode and the anode, the term "substrate" can be a cathode.

The hybrid composite composition printed as described above is subjected to sintering. During sintering, an adhesive force between the hybrid composite and the substrate can be improved and some vehicle may evaporate. The sintering temperature may be determined in consideration of evaporation temperature and time of the vehicle of the hybrid composite composition. Typically, the sintering temperature may range from about 400 to about 500° C., for example about 450° C. When the sintering temperature is less than about 400° C., the vehicle may insufficiently evaporate. On the other hand, when the sintering temperature is higher than about 500° C., the manufacturing costs may increase and the substrate can be damaged.

Sintering may be performed in an inert gas to prevent deterioration of a carbonaceous material. The inert gas can be nitrogen gas, argon gas, neon gas, xenon gas, or a mixture thereof.

The present invention provides an electron emitter prepared as described above, and an electron emission device including the electron emitter.

An electron emission device including an electron emitter according to an embodiment of the present invention includes a first substrate, a cathode and an electron emitter disposed on the first substrate, a gate electrode electrically insulated from the cathode, and an insulating layer disposed between the cathode and the gate electrode insulating the cathode from the gate electrode. The electron emitter includes the hybrid composite described above.

The electron emission device may have various structures. For example, the electron emission device may further include a second insulating layer covering an upper portion of the gate electrode, and a focusing electrode insulated from the gate electrode by the second insulating layer and disposed in parallel with respect to the gate electrode.

The electron emission device may be used in various electronic devices, for example, vacuum electronic devices, such as flat panel displays, televisions, X-ray tubes, emission gate amplifiers, and the like.

Figure 1:
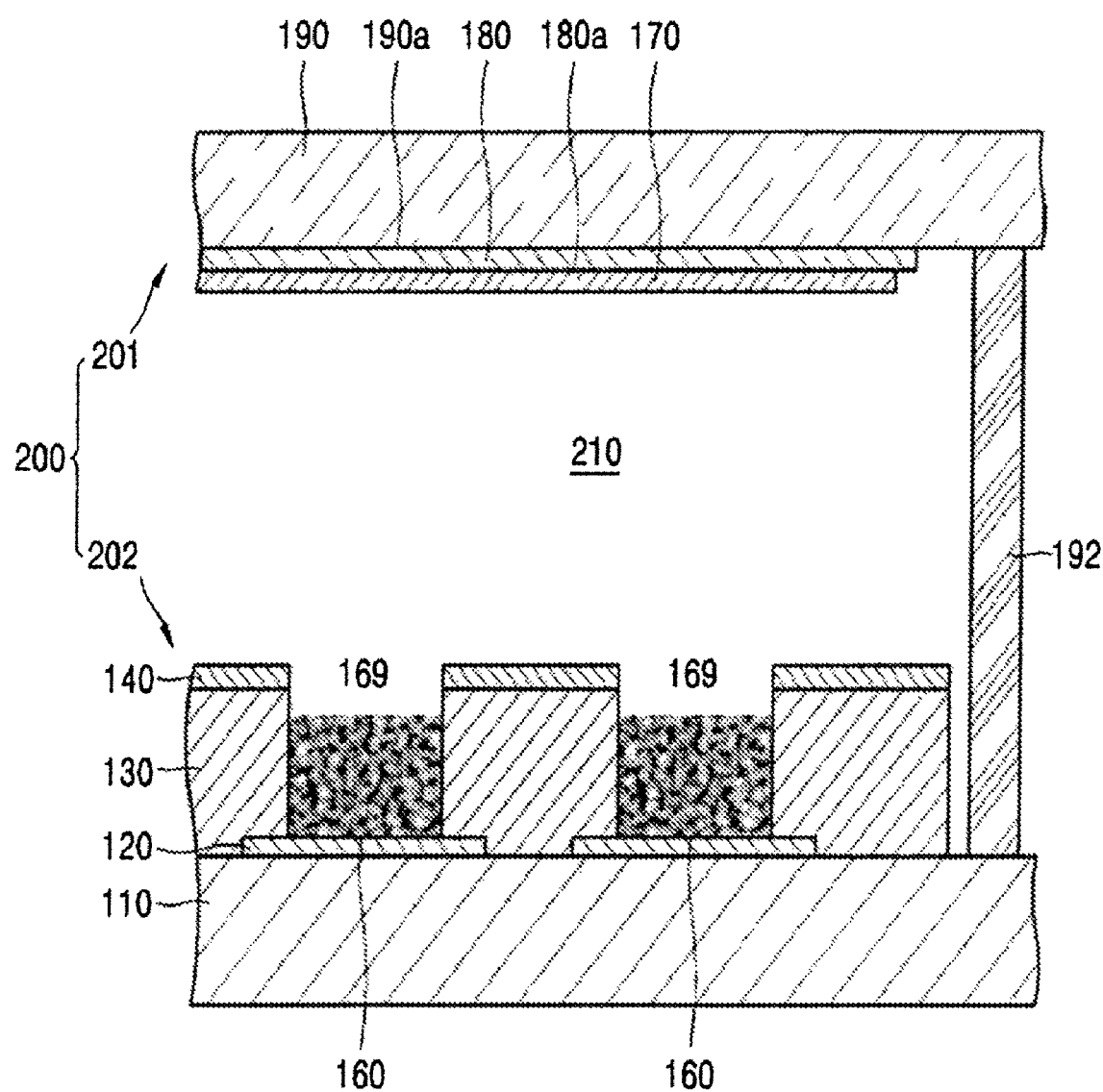
FIG. 1 is a partial cross-sectional view of an electron emission device according to an embodiment of the present invention.

FIG. 1 is a partial cross-sectional view of an electron emission device 200 according to an embodiment of the present invention, specifically a triode-structured electron emission device. Referring to FIG. 1, the electron emission device 200 includes a top panel 201 and a bottom panel 202. The top panel 201 includes a top substrate 190, an anode 180 disposed on a first surface 190a of the top substrate 190, and a phosphor layer 170 disposed on a first surface 180a of the anode 180.

The bottom panel 202 includes a bottom substrate 110 which faces, is disposed in parallel with respect to, and is separated from the top substrate 190 by an interval such that an inner space is formed. A cathode 120 is disposed in a striped pattern on the bottom substrate 110, a gate electrode 140 is disposed perpendicular to the cathode 120 in a striped pattern, an insulating layer 130 is disposed between the gate electrode 140 and the cathode 120, an electron emitter hole 169 is formed in portions of the insulating layer 130 and gate electrode 140, and an electron emitter 160 is disposed in the electron emitter hole 169, electrically connected to the cathode 120, and disposed lower than the gate electrode 140.

The top panel 201 and the bottom panel 202 are maintained by vacuum that is lower in pressure than the atmosphere. A spacer 192 supports the pressure generated by the vacuum between the top panel 201 and the bottom panel 202 and partitions an emission space 210 between the top panel 201 and the bottom panel 202. The anode 180 provides high voltage required to accelerate electrons emitted from the electron emitter 160 so that electrons collide with the phosphor layer 170 at high speeds. The phosphor layer 170 is excited by the electrons and the energy level of the phosphor layer 170 is decreased from a high energy level to a low energy level, emitting visible light. With respect to an electron emission device for creating color images, a red phosphor layer, a green phosphor layer, and a blue phosphor layer (together constituting a unit pixel) are disposed on the first surface 180a of the anode 180 in each of the plurality of emission spaces 210.

The gate electrode 140 promotes easy emission of electrons from the electron emitter 160, and the insulating layer 130 partitions the electron emitter hole 169 and insulates the electron emitter 160 from the gate electrode 140. The electron emitter 160 that emits electrons by field formation includes the hybrid composite as described above.

The electron emission device according to the present invention can be used as a backlight unit of a liquid crystal display device. The liquid crystal display device typically includes a liquid crystal panel assembly and a backlight unit providing light to the liquid crystal panel assembly. The liquid crystal panel assembly can form an image by transmitting or blocking light provided from the backlight unit.

Exemplary embodiments of the present invention will now be described with reference to the following examples. These examples are provided for illustrative purposes only and are not intended to limit the scope of the present invention.

MANUFACTURING EXAMPLE 1

Preparation of Carbide-Derived Carbon Material 100 g of α-SiC having an average particle size of 0.7 mm as a carbon precursor was thermochemically reacted with $Cl_2$ gas flowing at a flow rate of 3 l per minute at 1100° C. in a high-temperature electric furnace including a graphite reaction chamber and a transformer, so that Si was extracted from the carbon precursor. As a result, 30 g of a carbide-derived carbon material was prepared.

FIG. 2A is a SEM image and FIG. 2B is a TEM image of the carbide-derived carbon material prepared according to manufacturing example 1.

EXAMPLE 1

Preparation of Electron Emitter (1) Preparation of Hybrid Composite Composition 0.5 g of the carbide-derived carbon material obtained according to Manufacturing Example 1, 1.0 g of carbon nanotubes, 37.5 g of poly(methyl methacrylate-co-methacrylic acid) copolymer (monomer ratio of 3:1, Mw of 12,000 g/mol), 26 g of trimethylolpropanethoxylatetriacrylate(TM-PEOTA) acting as a crosslinking agent, 27.5 g of texanol acting as an organic solvent, 5 g of benzophenone acting as a photoinitiator, and 2.5 g of dioctylphthalate(DOP) acting as a plasticizer were mixed. The obtained mixture was uniformly mixed and dispersed using a 3-roll mill. As a result, a hybrid composite composition was prepared.

(2) Preparation of Electron Emitter

The hybrid composite composition was used as an ink and printed (using a commercially available piezo-type inkjet printer including a single nozzle) on a borosilicate glass substrate such that the printed hybrid composite composition coating layer had a width of 20 μm, a coating thickness of 3 μm, and a length of 2 inches. Subsequently, the printed hybrid composite composition coating layer was sintered using an electric furnace at 400° C. for 30 minutes. As a result, an electron emitter according to the present invention was prepared.

EXAMPLES 2 THROUGH 5

Preparation of Electron Emitter

Hybrid composite compositions were prepared in the same manner as in Example 1, except that the amounts of the carbide-derived carbon material, carbon nanotubes, and vehicle according to Table 1 were used. The ratio of components of the vehicle was the same as in Example 1.

Electron emitters were prepared in the same manner as in Example 1, except that the hybrid composite compositions listed in Table 1 were used.

TABLE 1

| | wt % | | |
| --- | --- | --- | --- |
| | Carbide-Derived Carbon Material | Carbon Nanotubes | Vehicle |
| Example 1 | 0.5 | 1.0 | 98.5 |
| Example 2 | 0.5 | 0.5 | 99 |
| Example 3 | 2 | 1 | 97 |
| Example 4 | 4 | 0.04 | 95.96 |
| Example 5 | 4 | 0.004 | 95.996 |

COMPARATIVE EXAMPLE 1

Preparation of Electron Emitter

A hybrid composite composition was prepared in the same manner as in Example 1, except that the carbide-derived carbon material was not used. An electron emitter was prepared in the same manner as in Example 1, except that a composition without the carbide-derived carbon material was used.

COMPARATIVE EXAMPLE 2

Preparation of Electron Emitter

A hybrid composite composition was prepared in the same manner as in Example 1, except that 4.5 wt % of an active carbon powder having a 325 mesh size prepared using a coconut shell (with a size of 44 μm or less) was used instead of the carbide-derived carbon material, and 0.004 wt % of carbon nanotubes was used.

An electron emitter was prepared in the same manner as in Example 1, except that the hybrid composite composition above was used.

EXAMPLE 6

Manufacturing of Electron Emission Device

Figure 9:
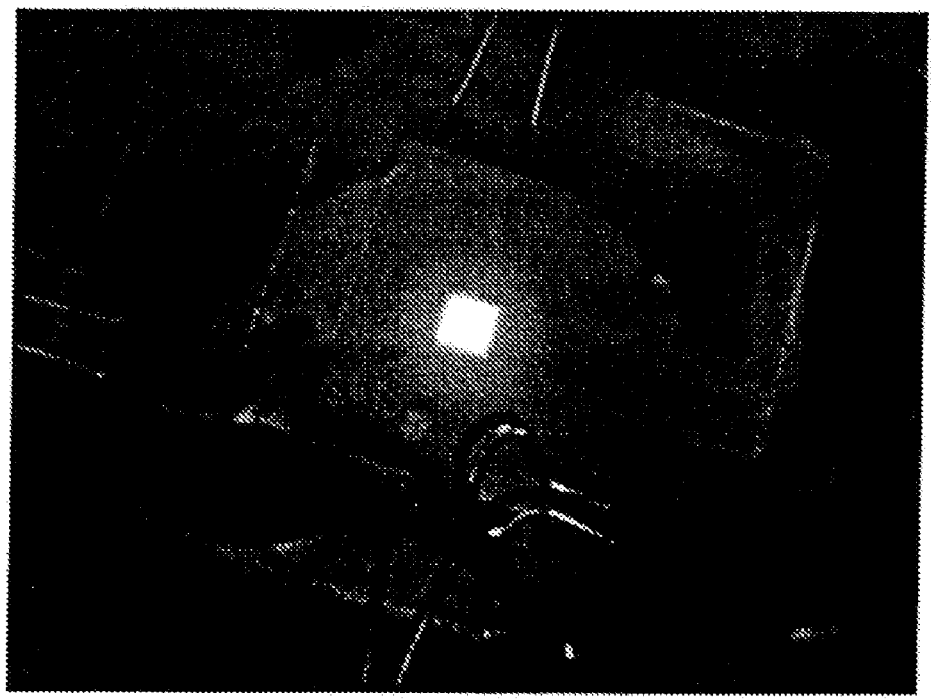
FIG. 9 is a light emitting image of an electron emission device according to an embodiment of the present invention.

An electron emission device was manufactured using the electron emitter prepared according to Example 1 as a cold cathode, a 100 μm-thick polyethyleneterephthalate film as a spacer, and a copper plate as an anode. FIG. 9 is a light emitting image of the electron emission device obtained.

Also, electron emission devices were manufactured using the electron emitters obtained according to Examples 2 to 5 and Comparative Examples 1 and 2 in the same manner as described above.

Figure 10:
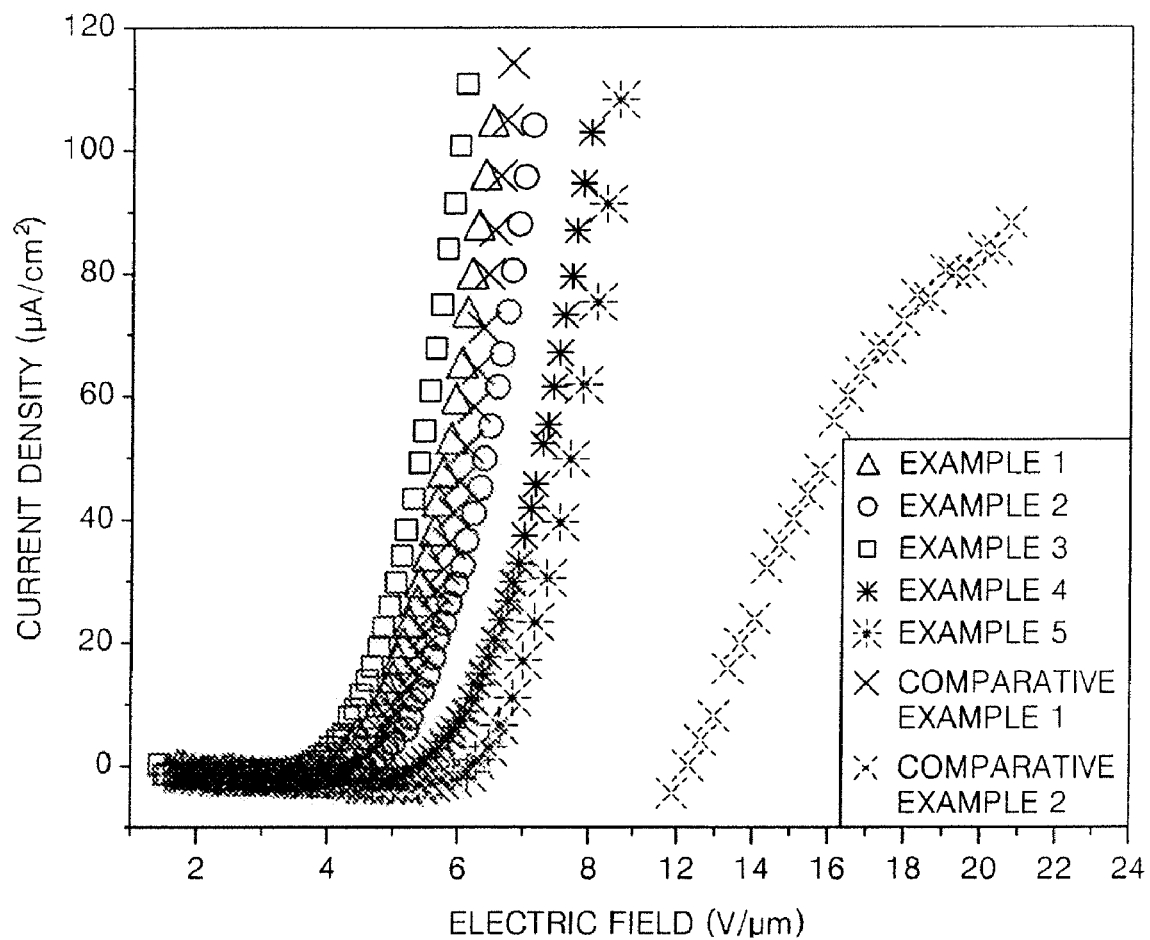
FIG. 10 is a graph of current density with respect to electric field of an electron emission device according to an embodiment of the present invention.

Electron Emission Device Performance Test (1) Current Density with Respect to Electric Field An emission current density of each of the electron emission devices was measured by applying a pulse voltage with a 1/500 duty ratio. The results are shown in FIG. 10 and Table 2.

(2) Lifetime of Electron Emission Device

Figure 11:
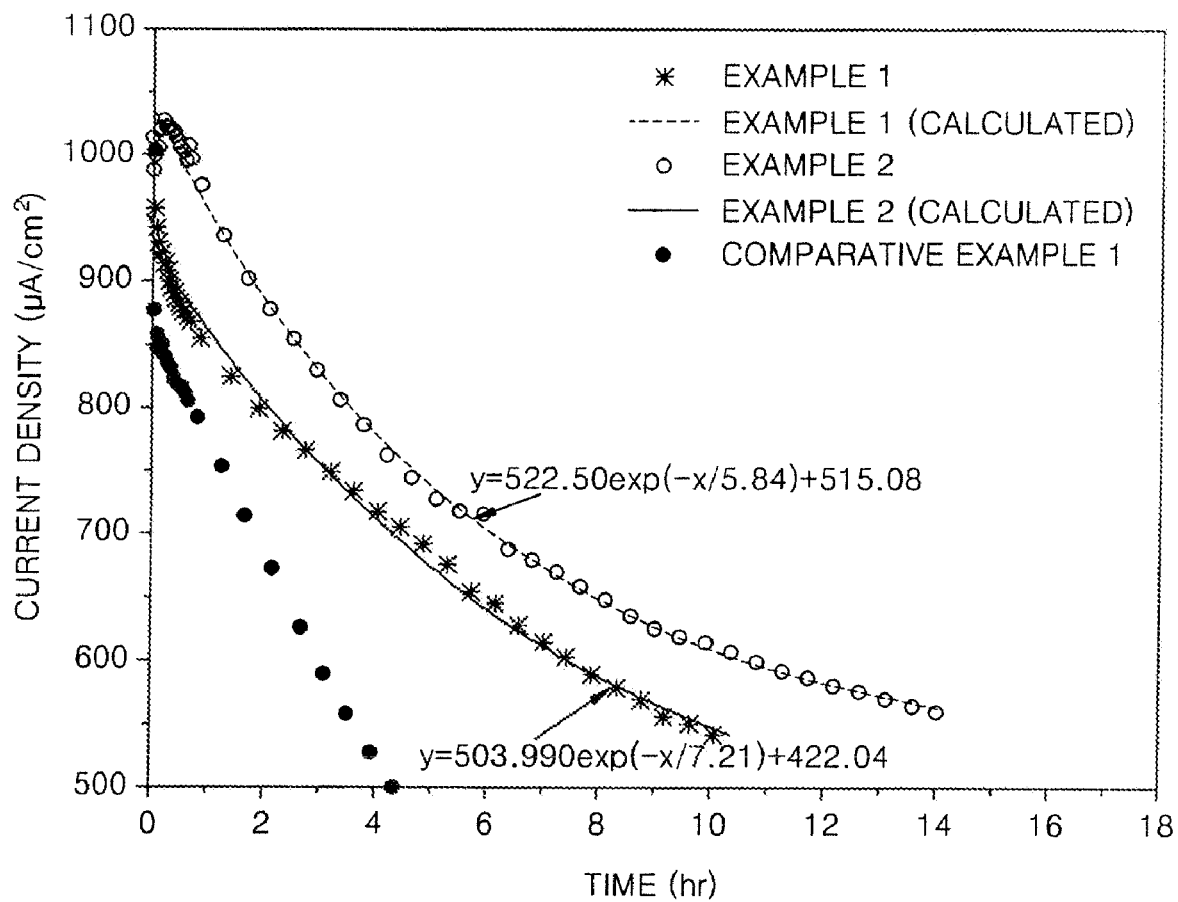
FIG. 11 is a graph of current density with respect to time of an electron emission device according to an embodiment of the present invention.

A half-life of the current density of each of the electron emission devices with respect to time was measured under the condition that voltage was maintained to emit 1 mA/cm² of the current density. Thus, accelerated lifetimes of the electron emission devices were compared to each other. Such a lifetime measurement condition is a very harsh condition, and in fact, an electron emission device can have desired brightness even with a current density of a few μA/cm². Although the lifetime of an electron emission device cannot be exactly measured since an accelerated coefficient with respect to the lifetime of CNT was not known until now, lifetimes of electron emission devices including the electron emitter prepared according to Examples 1 to 5 and Comparative Examples 1 and 2 can be compared to each other using the measurement method as described above. However, the lifetimes of the electron emission devices prepared according to Examples 4, 5, and Comparative Example 2 could not be measured. The measurement results and extrapolated results (measured value) are shown in Table 2 and FIG. 11. The lifetime was decreased according to a primary exponential function, and equations of the function are illustrated in FIG. 11. R square values with respect to Example 1 and Example 2 were 0.9962 and 0.9898, respectively, and thus, it is assumed that actually measured results are the same as the extrapolated results.

(3) Uniformity of Pixels

Triode-structured emission devices in which pixels can operate were manufactured. In the triode-structured emission devices, 2" cathodes prepared by injecting the electron emitter forming compositions prepared according to Examples 1 to 5 and Comparative Example 1 and 2 were separated from 2" anodes coated with a white blending phosphor by a distance of 10 mm. When a voltage (Va=4 kV, Vs =100V) was applied to the triode-structured emission devices and the current density reached about 60 μA, a degree of dispersion of brightnesses of each of 5 areas was measured/calculated, and an average value of the degrees of dispersion of the five areas was used to assess the uniformity of pixels. The obtained results are shown in Table 2.

emission characteristics of 100 μA/cm² at about 6.01 to about 8.31 V/μm.

According to the present invention, dispersibility of the electron emitter is improved, and processibility of the electron emission device is improved. In addition, an electron emission device according to the present invention has excellent field emission performance, improved uniformity, and improved lifetime, and can be used as a backlight unit (BLU) of a flat panel display.

While the present invention has been illustrated and described with reference to certain exemplary embodiments, it will be understood by those of ordinary skill in the art that various modifications and changes to the described embodiments may be made without departing from the spirit and scope of the present invention as defined by the following claims.

What is claimed is:

1. A hybrid composite comprising:
   at least one carbon nanotube; and
   a carbide-derived carbon material comprising a thermochemical reaction product of a carbide compound with a halogen-containing gas in which substantially all elements except for carbon in the carbide compound are extracted, and wherein the carbide-derived material comprises at least one property of amorphous carbon,
   wherein a weight ratio of the at least one carbon nanotube with respect to the carbide-derived carbon material ranges from about 0.0001 to about 5.

2. The hybrid composite of claim 1, wherein the carbide compound is selected from the group consisting of silicon

TABLE 2

|  | Amount | | Turn-on Field | Test Results | | Uniformity of pixels | |
|---|---|---|---|---|---|---|---|
|  | CDC* | CNT** | (V/μm) | Field Emission Characteristics | Lifetime (Time) | a-PU | p-PU |
| Example 1 | 0.5 | 1.0 | 4.12 | 100 μA/cm² @ 6.45 V/μm | 36.72 | 92.5 | 69.9 |
| Example 2 | 0.5 | 0.5 | 4.65 | 100 μA/cm² @ 7.05 V/μm | 43.64 | 91.4 | 66.4 |
| Example 3 | 2 | 1 | 3.85 | 100 μA/cm² @ 6.01 V/μm | 40.18 | 89.4 | 65.8 |
| Example 4 | 4 | 0.04 | 5.45 | 100 μA/cm² @ 7.95 V/μm | Not measurable | 91.8 | 71.3 |
| Example 5 | 4 | 0.004 | 6.25 | 100 μA/cm² @ 8.31 V/μm | Not measurable | 92.8 | 72.7 |
| Comparative Example 1 | 0 | 1.0 | 4.45 | 100 μA/cm² @ 6.68 V/μm | 4.35 | 87.4 | 61.5 |
| Comparative Example 2 | 4.5 | 0.004 (Active Carbon) | 12.5 | 100 μA/cm² @ 22.02 V/μm | Not measurable | — | — |

CDC* carbide-derived carbon material
CNT** carbon nanotubes

Referring to Table 2, an electron emission device manufactured using a hybrid composite of at least one carbon nanotube and a carbide-derived carbon material showed 1000% greater lifetime than compositions using carbon nanotubes alone or other carbonaceous materials. In addition, the electron emission devices according to the present invention showed excellent pixel uniformity compared to the electron emission devices prepared according to Comparative Examples 1 and 2. Furthermore, the electron emission devices according to the present invention had turn-on fields from about 3.85 to about 6.25 V/μm, and excellent field carbide (Si—C), boron carbide (B—C), titanium carbide (Ti—C), zirconium carbide (Zr—C), aluminum carbide (Al—C), calcium carbide (Ca—C), titanium-tantalum carbide (Ti—Ta—C), molybdenum-tungsten carbide(Mo—W—C), titanium carbonitride (Ti—C—N), zirconium carbonitride (Zr—C—N), and combinations thereof.

3. The hybrid composite of claim 2, wherein the carbide compound is selected from the group consisting of silicon carbide, boron carbide, and aluminum carbide.

4. The hybrid composite of claim 1, wherein the carbide derived carbon material comprises a material that when subjected to Raman spectrum analysis conditions including Ar 514.5 nm, 2 mW, 60 sec (twice), and 50×, exhibits an intensity ratio of a disordered-induced D band at 1350 cm−1 to a graphite G band at 1590 cm−1 ranging from about 0.2 to about 5.

5. The hybrid composite of claim 1, wherein the carbide-derived carbon material comprises a specific surface area ranging from about 500 m2/g to about 1400 m2/g.

6. The hybrid composite of claim 1, wherein the carbide-derived carbon material comprises a material that when subjected to X-ray diffraction analysis, exhibits a weak peak or wide single peak of a graphite (002) surface at 2θ=25.

7. The hybrid composite of claim 1, wherein the carbide-derived carbon material comprises a material that when subjected to transmission electron microscope analysis, exhibits a halo-pattern of an amorphous carbon.

* * * * *

UNITED STATES PATENT AND TRADEMARK OFFICE
CERTIFICATE OF CORRECTION

PATENT NO. : 7,871,545 B2  Page 1 of 1
APPLICATION NO. : 12/118618
DATED : January 18, 2011
INVENTOR(S) : Yoon-Jin Kim et al.

It is certified that error appears in the above-identified patent and that said Letters Patent is hereby corrected as shown below:

In the Claims

Column 13, Claim 4, line 3   Delete "1350 cm-1" Insert -- $1350 cm^{-1}$ --

Column 13, Claim 4, line 4   Delete "1590 cm-1" Insert -- $1590 cm^{-1}$ --

Column 13, Claim 5, line 8   Delete "500 m2/g" Insert -- $500 m^2/g$ --

Column 13, Claim 5, line 8   Delete "1400 m2/g" Insert -- $1400 m^2/g$ --

Signed and Sealed this
Twenty-ninth Day of May, 2012

David J. Kappos
*Director of the United States Patent and Trademark Office*